US005316512A

United States Patent [19]

Ell

[11] Patent Number: 5,316,512

[45] Date of Patent: May 31, 1994

[54] LAMP PULLER

[76] Inventor: William Ell, N87 W17785 Shepherd Dr., Menomonee Falls, Wis. 53051

[21] Appl. No.: 663,540

[22] Filed: Mar. 1, 1991

[51] Int. Cl.⁵ .......................... H01J 9/50; B23P 19/04; B25B 7/02

[52] U.S. Cl. .......................................... 445/61; 29/764; 81/426.5

[58] Field of Search ........................ 29/764; 445/61, 2; 81/426.5, 53.11, 53.12, 416

[56] References Cited

U.S. PATENT DOCUMENTS

| | | | |
|---|---|---|---|
| 927,908 | 7/1909 | Webb | 81/53.11 |
| 1,053,770 | 2/1913 | Barager | 81/53.11 |
| 1,346,022 | 7/1920 | Hasell | 81/53.11 |
| 1,529,572 | 3/1925 | Braud | 81/53.11 |
| 1,896,680 | 2/1933 | Palmer | 81/53.11 |
| 2,087,758 | 7/1937 | Friend | 81/426.5 |
| 2,223,344 | 12/1940 | Grinnell | 81/53.11 |
| 2,234,026 | 3/1941 | Smith | 81/53.11 |
| 4,475,283 | 10/1984 | Olson et al. | 29/764 |

*Primary Examiner*—Paula A. Bradley
*Assistant Examiner*—J. Todd Knapp

[57] ABSTRACT

A lamp puller for removing small lamps, such as miniature Christmas lamps, from their sockets is provided.

5 Claims, 1 Drawing Sheet

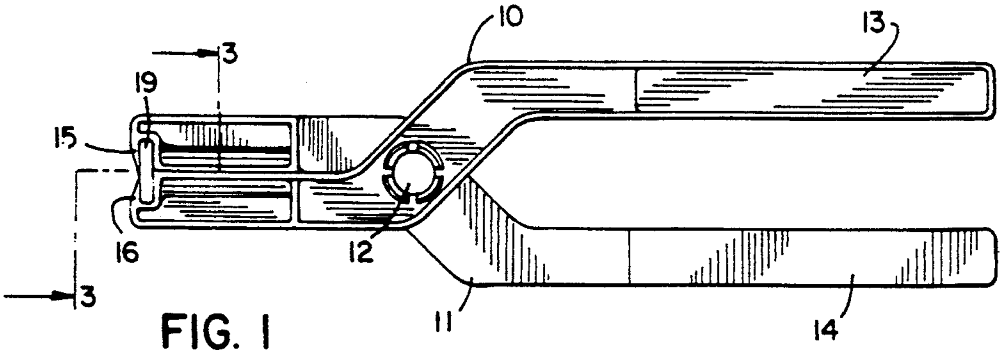
FIG. 1
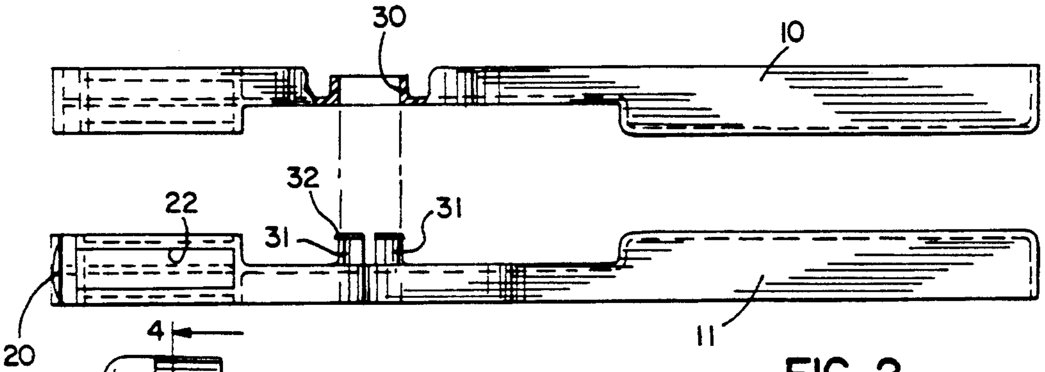
FIG. 2
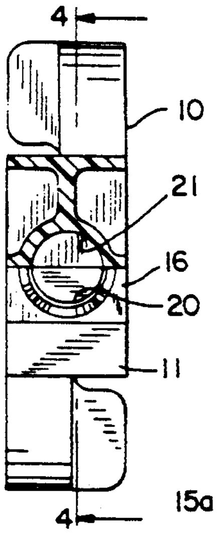
FIG. 3
FIG. 4
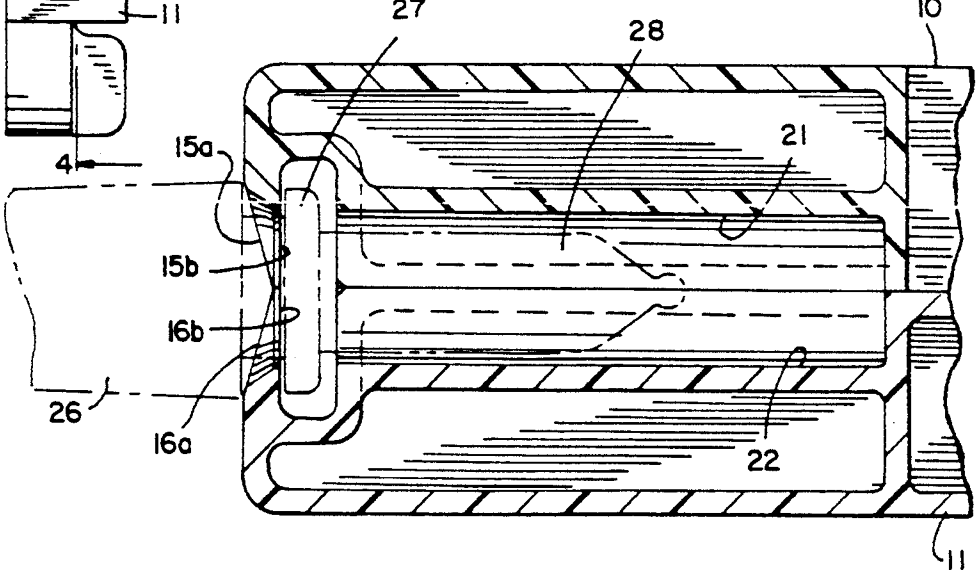

LAMP PULLER

BACKGROUND OF THE INVENTION

This invention relates to a lamp puller, and more particularly to a tool for removing small lamps such as miniature Christmas lamps from their sockets.

The typical miniature Christmas tree light set uses a low heat generating miniature lamp having a cylindrical bulb extending from a base. The leads for the lamp extend through the base and must make contact with appropriate connections in a socket for the lamp. The cooperating shapes of the socket and base of the lamp combine to force the thin extending leads into a proper position in the socket. To make the necessary electrical connection, the lamp base must fit very snugly into the socket. Typically the base and socket are formed of a plastic resin material that has a certain degree of flexibility and compressibility to accommodate the snug fit.

The lamps often require replacement. Because of their small size and snug fit in the sockets, the lamps are difficult to remove by hand. This is particularly true for those who have difficulty in coordinating their finger motion by reason of age or disability such as arthritis.

It is a principal object of the invention to provide a simple but effective tool for removing miniature lamps form their sockets.

It is another object of the invention to provide such a tool which will securely hold the lamp after it is removed.

SUMMARY OF THE INVENTION

The lamp puller is a pliers-like tool in which the two pivoting jaws have cooperating wedge portions at the ends of the jaws remote from the handles, and cooperating recesses inward of the wedge portions. The wedge portions cooperate to pry the base from the socket and the cooperating recesses cradle the lamp bulb as the lamp is withdrawn from the socket. The wedge portions have semicircular notches with wedge edges to encircle the base of the lamp.

The two jaws may be advantageously formed by injection molding with a pivot structure that can be assembled by being snapped together.

The foregoing and other objects and advantages of the invention will appear from the following description. In the description, reference is made to the accompanying drawing which illustrates a preferred embodiment of the invention.

BRIEF DESCRIPTION OF THE DRAWING

FIG. 1 is a plan view of a lamp puller in accordance with the present invention;

FIG. 2 is an exploded side view of the two jaws forming the lamp puller;

FIG. 3 is an enlarged end view, partly in section, taken in the plane of the line 3—3 of FIG. 1; and FIG. 4 is a view in section of the grasping end of the lamp puller showing it closed about a lamp for removal from a socket and taken in the place of the line 4—4 of FIG. 3.

DETAILED DESCRIPTION OF THE PREFERRED EMBODIMENT

The lamp puller is a pliers-like tool formed of a pair of jaws 10 and 11 joined together at a pivot 12. The jaws 10 and 11 have respective handle portions 13 and 14 extending rearwardly from the pivot 12. At the extreme opposite end of the jaws 10 and 11 are wedge portions 15 and 16, respectively. The wedge portions 15 and 16 each have an outwardly facing inclined surface 15*a* and 16*a* and an inwardly facing transverse surface 15*b* and 16*b*. As shown in FIGS. 1 and 4, the transverse surfaces 15*b* and 16*b* define a transverse opening 19 through the tool.

The wedge portions 15 and 16 each have a semicircular notch 20 which together define a circular opening when the jaws 10 and 11 are closed. The edges of the notches 20 are themselves wedge shaped.

Each of the jaws 10 and 11 is also formed with a recess 21 and 22, respectively, which is in the shape of a semicircular cylinder and which extends from the transverse opening 19 towards the pivot 12. The two recesses 21 and 22 together define a pocket to receive and cradle the glass bulb end of the electric lamp.

As shown in FIG. 4, the jaws 10 and 11 of the lamp puller can close upon a lamp extending from a socket 26. The wedge portions 15 and 16 of the jaws will engage behind the flange 27 that forms a part of the base of the lamp. As the jaws are closed, the wedge portions 15 and 16 will pry the flange 27 forward out of the socket 26. The loosened lamp can then be withdrawn from the socket 26 while it is held in the puller. During the prying and extraction process, the glass bulb 28 of the lamp is cradled within the pocket formed by the recesses 21 and 22 so that no pressure is applied to the glass bulb. Furthermore, the withdrawn lamp can be held in the lamp puller until the handles are opened.

The lamp puller can be formed by injection molding the two jaws 10 and 11. The molded jaws can be assembled by snapping them together at the pivot. As shown in FIG. 2 one jaw 10 can be formed with a circular boss 30 surrounding the location of the pivot 12 and the other jaw 11 can be formed with a series of projecting circular cylindrical segments 31 which fit within the boss 30. The segments 31 each have a flange 32 on its outer end which resist withdrawal of the segments from the boss once the segments have been snapped in place.

I claim:

1. A lamp puller, comprising a pair of jaws joined together at a pivot, the jaws each having a handle portion on one side of the pivot and a working end on the other side of the pivot, the jaws each having a wedge portion on the working end that closes with the wedge portion of the other jaw as the jaws are closed, the wedge portion of each jaw having a semicircular notch with a wedge edge, and the jaws each having a recess inward of the wedge portion and opposing a like recess in the other jaw to define a pocket to receive the bulb of a lamp when the jaws are closed.

2. A lamp puller in accordance with claim 1 wherein the recesses are each semicircular cylindrical recesses.

3. A lamp puller comprising a pair of jaws joined together at a pivot, the jaws each having a handle portion on one side of the pivot and a working end on the other side of the pivot, the pivot being formed by a circular boss in one jaw and a plurality of flanged circular segments extending from the other jaw that snap in place in the boss, the jaws each having a wedge portion on the working end that closes with the wedge portion of the other jaw as the jaws are closed, and the jaws each having a recess inward of the wedge portion and opposing a like recess in the other jaw to define a pocket to receive the bulb of a lamp when the jaws are closed.

4. A lamp puller for extracting a miniature lamp having a flanged base and a cylindrical bulb from a socket that receives the base, comprising:

a pair of jaws joined together at a pivot, the jaws each having a wedge portion at one end that closes with the wedge portion of the other jaw as the jaws are closed, the wedge portion of each jaw having a semicircular notch with a wedge edge, the wedge portions being adapted to engage between the base flange and the socket to pry the base out of the socket, and the jaws each having a recess formed between the wedge portion and the pivot and cooperating with the recess in the other jaw to define a pocket to cradle the bulb when the jaws are closed.

5. A lamp puller in accordance with claim 4 wherein the jaws when closed define an opening between the wedge portions and the recesses whereby the wedge portions surround the base and the flange is received in the opening when the jaws are closed.

* * * * *